(12) United States Patent
Tseng et al.

(10) Patent No.: US 12,393,084 B2
(45) Date of Patent: Aug. 19, 2025

(54) ELECTRONIC DEVICE AND METHOD OF MANUFACTURING THE SAME

(71) Applicant: InnoLux Corporation, Miao-Li County (TW)

(72) Inventors: Yu-Chih Tseng, Miao-Li County (TW); Pi-Ying Chuang, Miao-Li County (TW); Yi Tung, Miao-Li County (TW); Chu-Hong Lai, Miao-Li County (TW)

(73) Assignee: INNOLUX CORPORATION, Miao-Li County (TW)

( * ) Notice: Subject to any disclaimer, the term of this patent is extended or adjusted under 35 U.S.C. 154(b) by 0 days.

(21) Appl. No.: 18/812,318

(22) Filed: Aug. 22, 2024

(65) Prior Publication Data
US 2025/0110373 A1    Apr. 3, 2025

(30) Foreign Application Priority Data
Sep. 28, 2023 (CN) .......................... 202311266120.1

(51) Int. Cl.
*G02F 1/1333* (2006.01)
*G02F 1/1343* (2006.01)

(52) U.S. Cl.
CPC .. *G02F 1/134309* (2013.01); *G02F 1/133305* (2013.01); *G02F 1/133345* (2013.01)

(58) Field of Classification Search
CPC ..................... G02F 1/133305; G02F 1/134309
See application file for complete search history.

(56) References Cited

U.S. PATENT DOCUMENTS

| 10,985,194 | B2 | 4/2021 | Luo |
| 2013/0168704 | A1* | 7/2013 | Huang ............... H10D 86/0231 257/E33.062 |
| 2020/0083479 | A1 | 3/2020 | Park |
| 2024/0421028 | A1* | 12/2024 | Hayashiguchi ....... H01L 23/473 |

FOREIGN PATENT DOCUMENTS

CN        109459895 A       3/2019

* cited by examiner

*Primary Examiner* — Joseph L Williams
(74) *Attorney, Agent, or Firm* — McClure, Qualey & Rodack, LLP

(57) ABSTRACT

An electronic device includes: a first substrate, wherein the first substrate is flexible; a second substrate disposed corresponding to the first substrate, wherein the second substrate is flexible; and a first conductive layer disposed on the first substrate. The first conductive layer includes: a first conductive pattern for receiving a first electrode signal and including a first bonding part; and a second conductive pattern for receiving a second electrode signal and including a second bonding part. The electronic device further includes: a second conductive layer disposed on the second substrate and electrically connected to the second conductive pattern; and a first metal layer disposed between the first substrate and at least one of the first bonding part and the second bonding part and is electrically connected to the at least one of the first bonding part and the second bonding part.

18 Claims, 10 Drawing Sheets

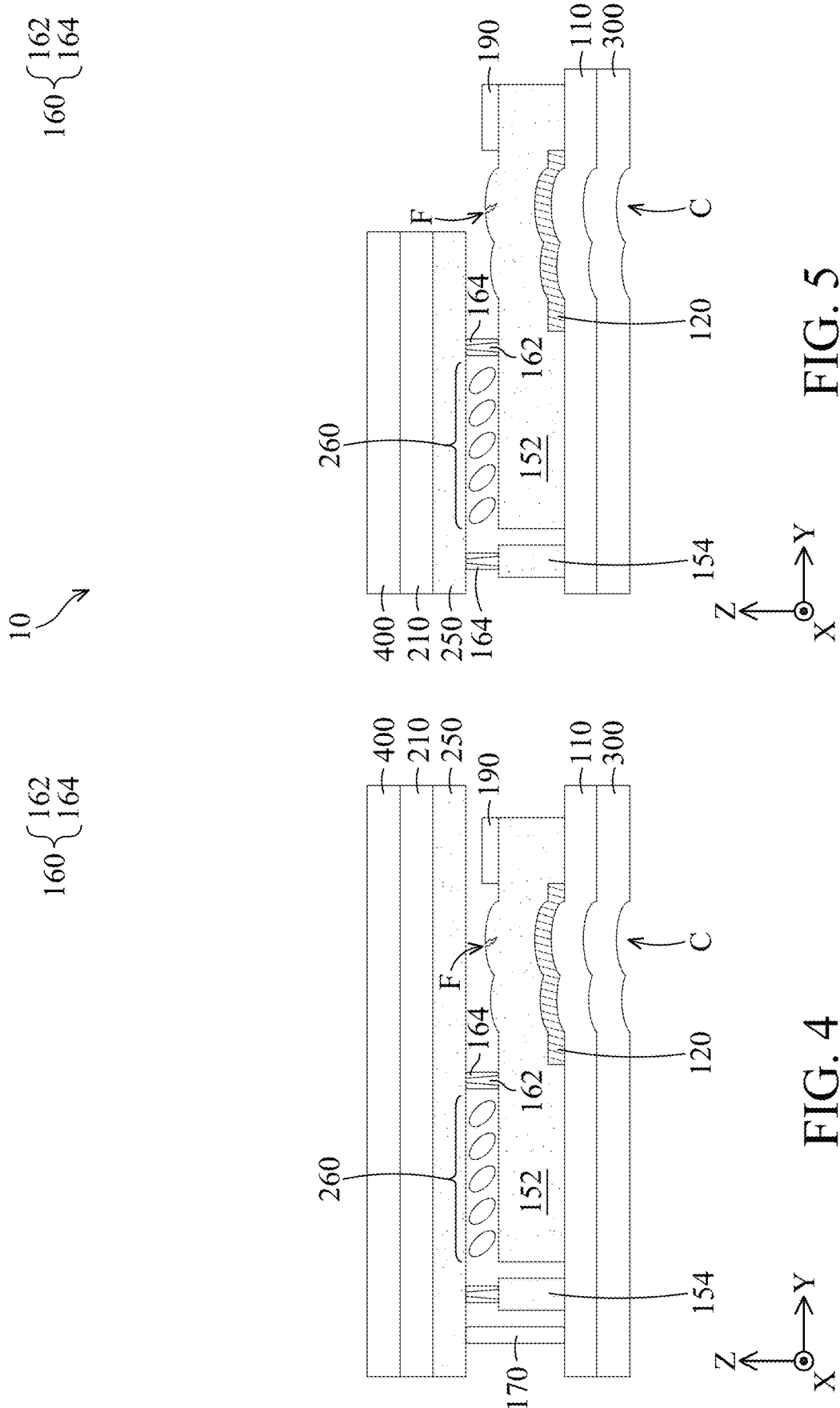

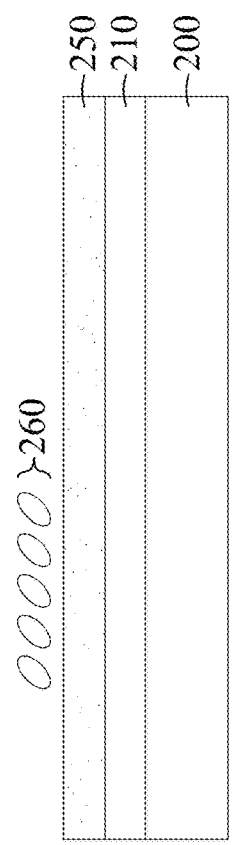
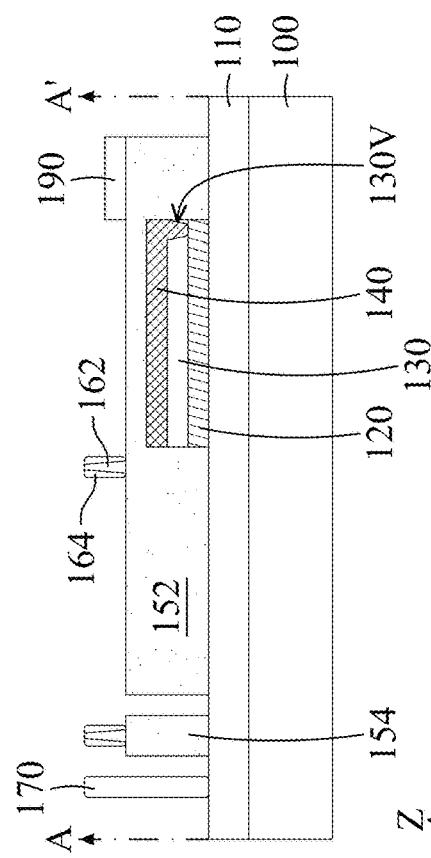
FIG. 9
FIG. 10

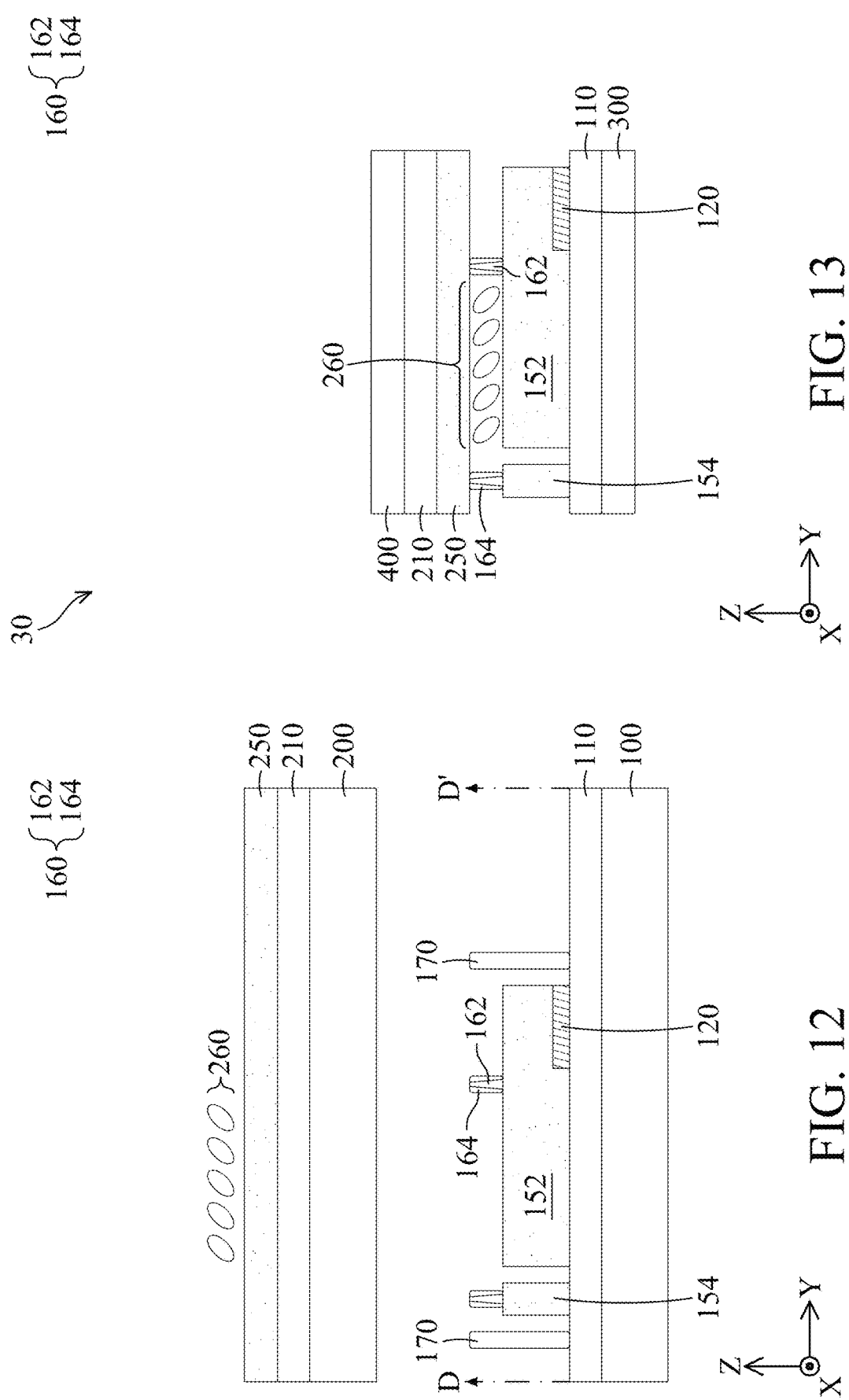

ELECTRONIC DEVICE AND METHOD OF MANUFACTURING THE SAME

CROSS-REFERENCE TO RELATED APPLICATIONS

This application claims priority of China Patent Application No. 202311266120.1, filed Sep. 28, 2023, the entirety of which is incorporated by reference herein.

BACKGROUND

Technical Field

The present disclosure relates to an electronic device and method of manufacturing the same, and in particular, to assisting signal transmission with a metal layer.

Description of the Related Art

Electronic devices have been broadly applied in the fields of communication, display, automobile, aviation, or the like. As the development of electronic devices continues to advance, research into electronic devices has been focused on producing lighter and thinner products. Therefore, the demand for electronic devices with better reliability and higher quality has increased.

SUMMARY

An embodiment of the present disclosure provides an electronic device, the electronic device includes: a first substrate, wherein the first substrate is flexible; a second substrate disposed corresponding to the first substrate, wherein the second substrate is flexible; and a first conductive layer disposed on the first substrate. The first conductive layer includes: a first conductive pattern for receiving a first electrode signal and including a first bonding part; and a second conductive pattern for receiving a second electrode signal and including a second bonding part. The electronic device further includes: a second conductive layer disposed on the second substrate and electrically connected to the second conductive pattern; and a first metal layer disposed between the first substrate and at least one of the first bonding part and the second bonding part, and is electrically connected to the at least one of the first bonding part and the second bonding part.

Another embodiment of the present disclosure provides an electronic device, the electronic device includes: a first substrate; a second substrate disposed corresponding to the first substrate; and a first conductive layer disposed on the first substrate. The first conductive layer includes: a first conductive pattern for receiving a first electrode signal and including a first bonding part; and a second conductive pattern for receiving a second electrode signal and including a second bonding part. The electronic device further includes: a second conductive layer disposed on the second substrate and is electrically connected to the second conductive pattern; a first metal layer disposed between the first substrate and at least one of the first bonding part and the second bonding part; a passivation layer disposed on the first metal layer; and a second metal layer disposed on the passivation layer. The passivation layer has an opening, and the second metal layer fills the opening and is electrically connected to the first metal layer.

Yet another embodiment of the present disclosure provides a method of manufacturing an electronic device, the method includes: providing a first carrier; forming a first substrate on the first carrier, wherein the first substrate is flexible; providing a second carrier; and forming a second substrate on the second carrier, wherein the second substrate is flexible. The method further includes: assembling the first substrate with the second substrate through a first seal and a second seal; removing the first carrier; removing the second carrier; and cutting off the second seal.

BRIEF DESCRIPTION OF THE DRAWINGS

The disclosure can be more fully understood from the following detailed description when read with the accompanying figures. It is worth noting that, in accordance with standard practice in the industry, various features are not drawn to scale. In fact, the dimensions of the various features may be arbitrarily increased or reduced for clarity of discussion.

FIGS. 2-5 are cross-sectional views of the electronic device, according to some embodiments of the present disclosure.

FIGS. 9 and 10 are cross-sectional views of the electronic device, according to some embodiments of the present disclosure.

FIGS. 12 and 13 are cross-sectional views of the electronic device, according to other embodiments of the present disclosure.

DETAILED DESCRIPTION OF THE DISCLOSURE

Figure 1:
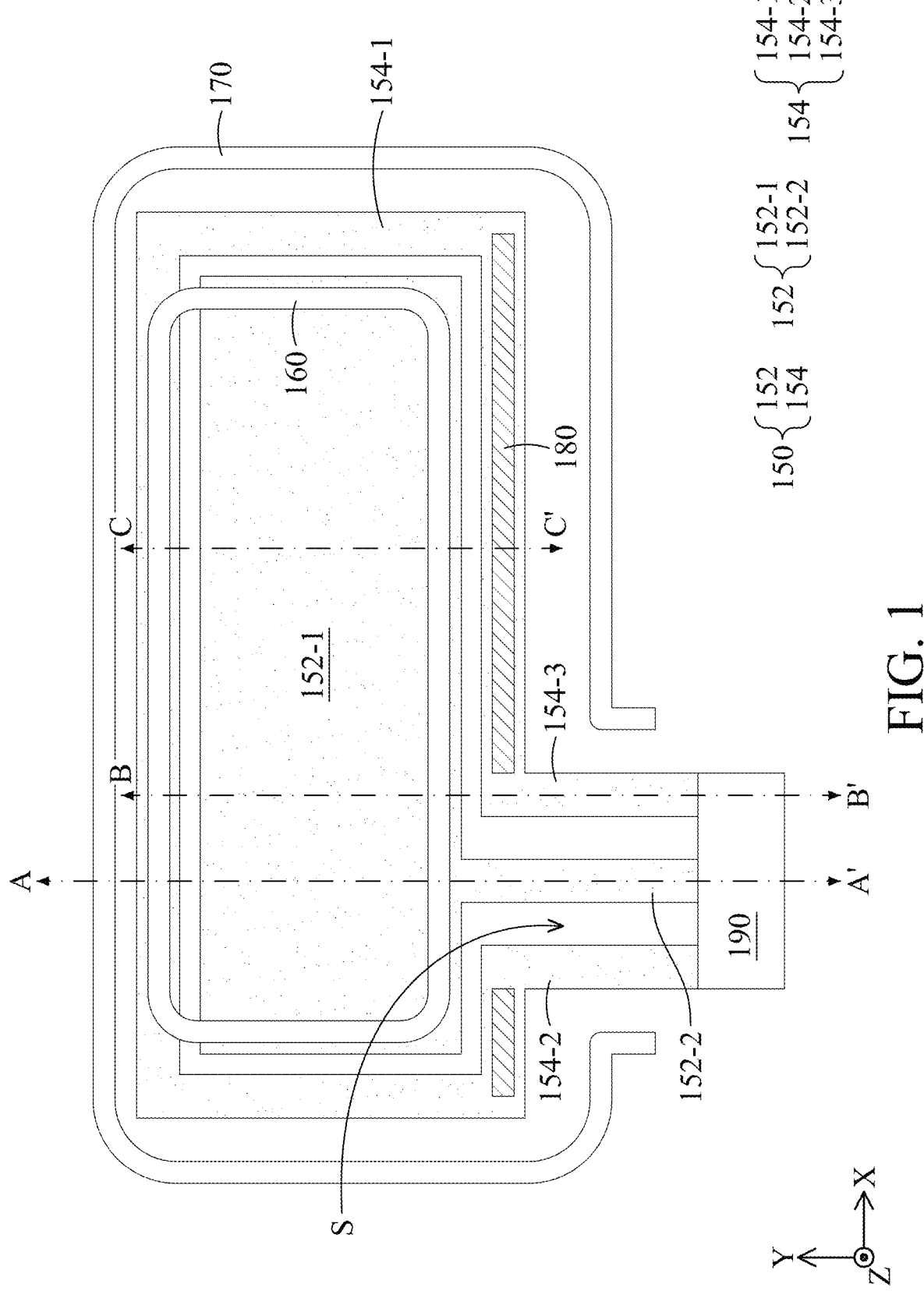
FIG. 1 is a top view of an electronic device, according to some embodiments of the present disclosure.

The following disclosure provides many different embodiments, or examples, for implementing different features of the subject matter provided. Specific examples of components and arrangements are described below to simplify the present disclosure. These are, of course, merely examples and are not intended to be limiting. For example, a first feature is formed on a second feature in the description that follows may include embodiments in which the first feature and second feature are formed in direct contact, and may also include embodiments in which additional features may be formed between the first feature and second feature, so that the first feature and second feature may not be in direct contact. In addition, the present disclosure may repeat reference numerals and/or letters in the various examples. This repetition is for the purpose of simplicity and clarity, and does not in itself dictate a relationship between various embodiments and/or configuration discussed.

The direction-related terms mentioned in the context, such as "up," "down," "front," "back," "left," "right," and the like, merely refers to the relative direction in the figures.

Therefore, the direction-related terms are for illustration, and they are not intended to limit the present disclosure.

Furthermore, in some embodiments of the present disclosure, terms that describe a joining or connecting action, such as "connect", "interconnect", or the like, unless otherwise defined, may include embodiments in which two features are formed in direct contact, and they may also include embodiments in which additional features may be formed between the two features. Regarding the terms, such as "connect", "interconnect", or the like, may also include embodiments in which the two features are both mobile, or the two features are both fixed. Furthermore, terms, such as "electrically connected", "coupled", or the like, may include any means to directly or indirectly establish electrical connection.

In addition, terms, such as "the first", "the second", or the like, mentioned in the specification or the claims are only used to name different elements or to distinguish different embodiments or examples, and they are not intended to limit the upper limit or the lower limit of the element quantity, and they are also not intended to limit the manufacturing order or the placement order of the elements.

In the present disclosure, the terms "about," "approximately" and "substantially" typically mean±20% of the stated value, more typically ±10% of the stated value, more typically ±5% of the stated value, more typically ±3% of the stated value, more typically ±2% of the stated value, more typically ±1% of the stated value, and even more typically ±0.5% of the stated value. The stated value of the present disclosure is an approximate value. That is, when there is no specific description of the terms "about," "approximately" and "substantially", the stated value includes the meaning of "about," "approximately" or "substantially".

Unless otherwise defined, all terms (including technical and scientific terms) used herein have the same meaning as commonly understood by one of ordinary skill in the art to which this disclosure belongs. It should be understood that terms such as those defined in commonly used dictionaries should be interpreted as having a meaning that is consistent with their meaning in the context of the prior art and will not be interpreted in an idealized or overly formal sense unless expressly so defined in the embodiments of the present disclosure.

Some variations of the embodiment are described. In different figures and illustrated embodiments, like reference numerals and/or letters are used to label like elements. It should be appreciated that additional operations can be provided before, during, and/or after the methods described in these embodiments. Additional features can be added to the semiconductor device structure. Some of the operations described below can be replaced or eliminated for different embodiments of the methods.

Throughout the context, each direction is not limited to perpendicular coordinates (such as x-axis, y-axis, and z-axis), and may be interpreted in a broader scope. For example, x-axis, y-axis, and z-axis may be perpendicular with each other, or they can represent different directions that are not perpendicular with each other. For ease of illustration, in the following context, x-axis is a lengthwise direction, y-axis is a widthwise direction, and z-axis is a thickness direction. In the embodiments of the present disclosure, z-axis is a normal direction of the substrate plane. In the embodiments of the present disclosure, top views refer to the observation of the x-y plane. In some embodiments, the first direction D1, the second direction D2, and the third direction D3 may be directions on the x-y plane. In some embodiments, the dimensions in different directions may be measured using optical images (for example, an image obtained by a scanning electron microscope (SEM)).

In the embodiments of the present disclosure, electronic devices may include a display apparatus, a backlight apparatus, an antenna apparatus, a sensor apparatus, or a stitching apparatus, but the present disclosure is not limited thereto. The electronic devices may be a bent or a flexed device. The display apparatus may be a non-self light emitted type display device or a self light emitted type display device. The antenna apparatus may be a liquid-crystal state device or a non-liquid-crystal state antenna device. The sensor apparatus may be a sensor device that senses capacitance, light rays, heat energy, or supersonic wave, but the present disclosure is not limited thereto. The electronic devices may include passive components or active components, for example, capacitors, resistors, inductors, diodes, transistors, or the like. The diodes may include a light emitting diode (LED) or a photodiode (PD). The light emitting diode may include for example an organic light emitting diode (OLED), a mini light emitting diode, a micro light emitting diode (uLED), or a quantum dot light emitting diode, but the present disclosure is not limited thereto. The stitching apparatus may be a display stitching device or an antenna stitching device, but the present disclosure is not limited thereto. It should be noted that the electronic devices may be any combinations of the aforementioned devices, but the present disclosure is not limited thereto. The following context may use the display apparatus or the stitching apparatus as the electronic devices to describe the subject matter of the present disclosure, but the present disclosure is not limited thereto.

Furthermore, the appearance of the electronic devices may be rectangular-shape, circular-shape, polygon-shape, curved edges-shape, or the like. The electronic devices may have a processing system, a driving system, a control system, a light source system, a shelf system, and other peripheral systems to support the display apparatus or the stitching apparatus. It should be noted that the electronic devices may be any combinations of the aforementioned systems, but the present disclosure is not limited thereto.

FIG. 1 is a top view of an electronic device, according to some embodiments of the present disclosure. For clarity, FIG. 1 only shows some elements, for illustration purpose. In some embodiments, additional elements may be incorporated into the electronic device 10 described below. In some embodiments, some elements of the electronic device 10 described below may be replaced or omitted. In some embodiments, additional operations may be provided before, during, and/or after the formation of the electronic device 10. In some embodiments, some operations described may be replaced or omitted, and the order of some operations described may be interchanged.

Figure 2:
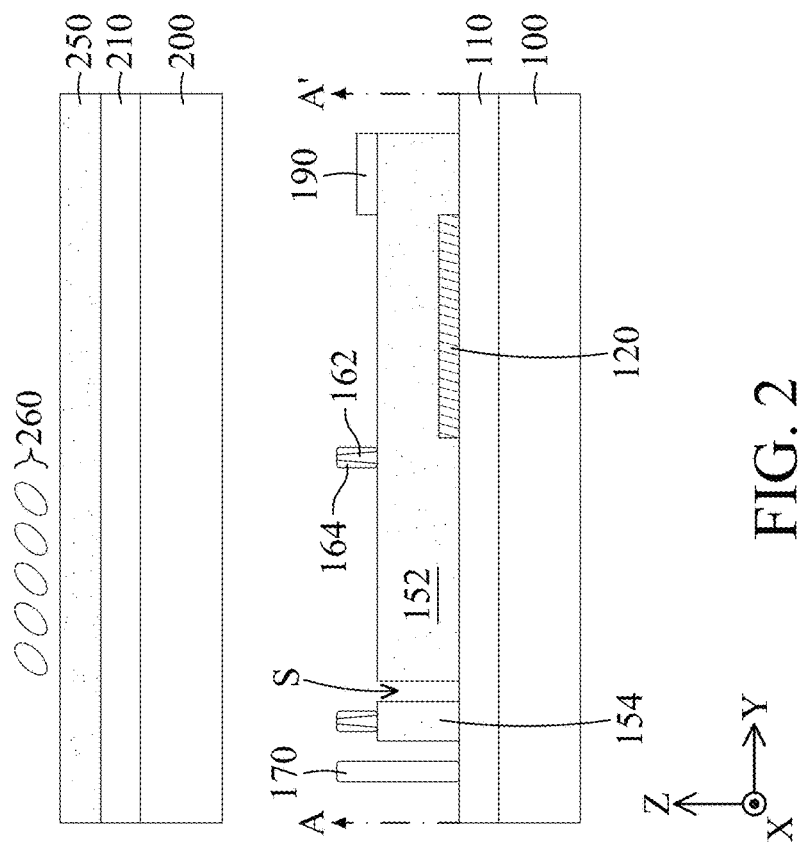

FIGS. 2-5 are cross-sectional views of the electronic device 10, according to some embodiments of the present disclosure. It should be noted that FIG. 2 is the cross-sectional view obtained from a line A-A' of FIG. 1. In some embodiments, the electronic device 10 may include a carrier 100, a substrate 110, a metal layer 120, a conductive layer 150, a seal 160, a seal 170, a metal line 180, a flexible printed circuit (FPC) 190, a carrier 200, a substrate 210, a conductive layer 250, and liquid crystals 260. The conductive layer 150 may include a first conductive pattern 152 and a second conductive pattern 154. The seal 160 may include a support structure 162 and a glue layer 164. For illustrative purpose, FIG. 1 only illustrates the elements above the substrate 110, including the conductive layer 150, the seal 160, the seal 170, the metal line 180, and the flexible printed circuit 190.

Referring to FIG. 2, the carrier 100 and the carrier 200 are provided. The substrate 110 and the substrate 210 are disposed on the carrier 100 and the carrier 200, respectively. The metal layer 120 is disposed on the substrate 110, and the conductive layer 150 (including the first conductive pattern 152 and the second conductive pattern 154) is disposed on the substrate 110 and the metal layer 120. The seal 160 (including the support structure 162 and the glue layer 164), the seal 170, and the flexible printed circuit 190 are disposed on the conductive layer 150. Furthermore, the conductive layer 250 is disposed on the substrate 210, and the liquid crystals 260 are disposed on the conductive layer 250.

According to some embodiment of the present disclosure, the carrier 100 may be used to carry the substrate 110. The carrier 100 may include relatively hard materials (for example, glass), for more effectively fix the substrate 110.

According to some embodiments of the present disclosure, the substrate 110 may be flexible. The substrate 110 may include flexible materials and an inorganic layer, wherein the flexible materials and the inorganic layer may be a single layer or multiple layers. In some embodiments, the substrate 110 may be multiple layers of the flexible materials and multiple inorganic layers that are alternately arranged. The flexible materials may include polyethylene terephthalate (PET) resins, polycarbonate (PC) resins, polyimide (PI) resins, polymethylmethacrylates (PMMA), polystyrene resins, polyethersulfone (PES) resins, polythiophene (PT) resins, phenol novolac (PN), the like, or a combination thereof, but the present disclosure is not limited thereto. The inorganic layers may include silicon oxide (SiO), silicon nitride (SiN), silicon carbide (SiC), silicon carbonitride (SiCN), silicon oxynitride (SiON), silicon oxynitrocarbide (Si-$O_xN_yC_{1-x-y}$), or a combination thereof, but the present disclosure is not limited thereto. In some embodiments, the substrate 110 may be glass.

In some embodiments, the formation of the substrate 110 on the carrier 100 may include slit-coating, spin-on coating, chemical vapor deposition (CVD), atomic layer deposition (ALD), or a combination, but the present disclosure is not limited thereto.

In some embodiments, the metal layer 120 is formed on the substrate 110. Materials of the metal layer 120 may include cobalt (Co), ruthenium (Ru), aluminum (Al), tungsten (W), copper (Cu), titanium (Ti), tantalum (Ta), silver (Ag), gold (Au), platinum (Pt), nickel (Ni), palladium (Pd), zinc (Zn) chromium (Cr), molybdenum (Mo), niobium (Nb), beryllium (Be), strontium (Sr), the like, or a combination thereof, but the present disclosure is not limited thereto.

In some embodiments, the formation of the metal layer 120 includes chemical vapor deposition, atomic layer deposition, physical vapor deposition (PVD), evaporation, plating, sputtering, or a combination thereof, but the present disclosure is not limited thereto. The metal layer 120 may be formed into patterns that are separated from each other using the patterning process, which includes the lithography process, the etching process, the like, or a combination thereof. The separated patterns of the metal layer 120 are overlapped and electrically connected to the bonding parts of the first conductive pattern 152 and/or the second conductive pattern 154, respectively.

In some embodiments, the conductive layer 150 covers the substrate 110 and the metal layer 120. In other words, the metal layer 120 is disposed between the substrate 110 and the conductive layer 150. The conductive layer 150 may transmit electrode signals. The conductive layer may include indium (III) oxide ($In_2O_3$), zinc oxide (ZnO), indium oxide-zinc oxide, aluminum-doped zinc oxide (AZO), gallium zinc oxide (GZO), indium tin oxide (ITO), indium zinc oxide (IZO), antimony tin oxide (ATO), indium gallium tin oxide (IGTO), tin (IV) oxide ($SnO_2$), or a combination thereof, but the present disclosure is not limited thereto. In some embodiments, the conductive layer 150 may be, for example, transparent conductive material. The formation of the conductive layer 150 may be similar to that of the metal layer 120, and the details are not described again herein to avoid repetition. In some embodiments, the ductility of the metal layer 120 is higher than that of the conductive layer 150.

In some embodiments, the conductive layer 150 may be patterned into the first conductive pattern 152 and the second conductive pattern 154 by the patterning process. As observed from the normal direction (for example, z-axis) of the substrate 110, the second conductive pattern 154 encircles the first conductive pattern 152. In some embodiments, the first conductive pattern 152 transmits a lower electrode signal and serves as a lower electrode for the electronic device, while the second conductive pattern 154 transmits an upper electrode signal.

The first conductive pattern 152 may include a main part 152-1 and a bonding part 152-2, while the second conductive pattern 154 may include a loop part 154-1, a bonding part 154-2, and a bonding part 154-3. The main part 152-1 and the bonding part 152-2 may be a single structure formed together, while the loop part 154-1, the bonding part 154-2, and the bonding part 154-3 may be a single structure formed together.

From another perspective, the bonding part 152-2 extend outward from the main part 152-1, while the bonding part 154-2 and the bonding part 154-3 extend outward from the loop part 154-1. In details, the loop part 154-1 of the present disclosure is a non-closed shape, allowing the bonding part 154-2 and the bonding part 154-3 to be extended outward from two ends of the loop part 154-1. Moreover, the bonding part 152-2, the bonding part 154-2, and the bonding part 154-3 may be parallel with each other, and may extend in the same direction. It is worth noted that since the transmitted electrode signals are different, the first conductive pattern 152 and the second conductive pattern 154 are separated by a spacing S.

According to some embodiments of the present disclosure, the metal layer 120 is located between the substrate 110 and at least one of the bonding part 152-2, the bonding part 154-2, and the bonding part 154-3, and is electrically connected with at least one of the bonding part 152-2, the bonding part 154-2, and the bonding part 154-3. For example, the metal layer 120 may be disposed below the bonding part 152-2, the bonding part 154-2, and the bonding part 154-3, and the metal layer 120 is electrically connected with all three bonding parts, respectively. In some embodiments, the metal layer 120 is disposed below one or two of the bonding part 152-2, the bonding part 154-2, and the bonding part 154-3, and the metal layer 120 is electrically connected with one or two bonding parts, respectively. It is worth noted that the metal layer 120 is located outside the active area in order to prevent the metal layer 120 from affecting the active area performance of the electronic device 10, for example, affecting the light transmittance effect of the electronic device 10.

In some embodiments, the flexible printed circuit 190 is electrically connected to the conductive layer 150. For example, the flexible printed circuit 190 may be located over the bonding part 152-2, the bonding part 154-2, and the bonding part 154-3, and may supply the lower electrode signal and the upper electrode signal to the first conductive pattern 152 and the second conductive pattern 154, respectively.

According to some embodiments of the present disclosure, the carrier 200 may be used to carry the substrate 210. The materials and the formation of the carrier 200 and the substrate 210 may be respectively similar to those of the carrier 100 and the substrate 110, and the details are not described again herein to avoid repetition.

In some embodiments, the conductive layer 250 may be disposed on the substrate 210, and is not patterned. According to some embodiments of the present disclosure, the conductive layer 250 may transmit the electrode signal, and serves as an upper electrode for the electronic device 10. The conductive layer 250 may be electrically connected with the second conductive pattern 154 of the conductive layer 150. The materials and the formation of the conductive layer 250 may be similar to those of the conductive layer 150, and the details are not described again herein to avoid repetition.

According to some embodiments of the present disclosure, the liquid crystals 260 are disposed on the conductive layer 250. The liquid crystals 260 may be twisted to a desired angle when the electric field is applied. The liquid crystals 260 may include nematic liquid crystals, vertical alignment (VA) liquid crystals, smectic liquid crystals, electrically controlled birefringence (ECB) liquid crystals, in plane switching (IPS) liquid crystals, fringe field switching (FFS) liquid crystals, cholesteric liquid crystals, or discotic liquid crystals, but the present disclosure is not limited thereto.

Figure 3:
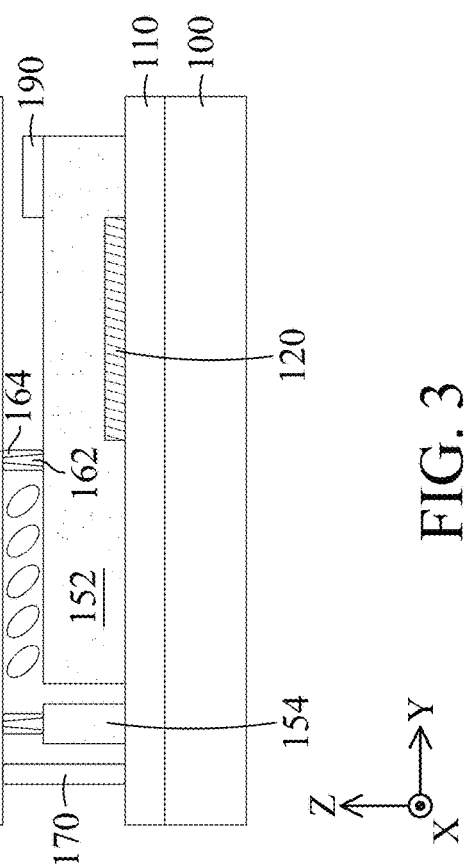

Referring to FIG. 3, the carrier 100 and the carrier 200 are assembled. More specifically, the substrate 110 and the substrate 210 are paired together through the seal 160 and the seal 170, so the liquid crystals 260 are enclosed by the substrate 110, the substrate 210, and the seal 160. The seal 160 may be disposed between the conductive layer 150 and the conductive layer 250. The support structure 162 of the seal 160 may support the substrate 110 and the substrate 210, and may maintain the gap for the liquid crystals 260, while the glue layer 164 of the seal 160 may ensure the adhesion between the conductive layer 150 and the conductive layer 250. The seal 170 may be disposed between the conductive layer 150 and the conductive layer 250. As observed from the normal direction (for example, z-axis) of the substrate 110, the seal 170 encircles the conductive layer 150 (including the first conductive pattern 152 and the second conductive pattern 154) to ensure the portion of the substrate 110 encircled by the seal 170 has a certain adhesion, which in turn protects the substrate 110 from deformation (for example, the generation the a crease) during subsequent process. In some embodiments, the seal 170 may define the scope of the subsequent dicing process.

In some embodiments, the seal 160 may define the active area of the electronic device (or the display area of the display deice). More specifically, the substrate 110, the seal 160, and the substrate 210 define the active area of the electronic device (or the display area of the display deice), and confine the liquid crystals 260 therein. In some embodiments, the seal 160 may be disposed on at least one of the main part 152-1, the loop part 154-1, and the spacing S. In other words, the active area of the electronic device may be confined within the first conductive pattern 152, or may span across the first conductive pattern 152, the spacing S, and the second conductive pattern 154, but the present disclosure is not limited thereto. It should be appreciated that the region outside the active area may be considered as the peripheral area. For example, the metal layer 120 and the flexible printed circuit 190 are located in the peripheral area. It is worth noted that as observed from a direction perpendicular to the normal direction of the substrate 110 (for example, y-axis), the flexible printed circuit 190 is not in contact with the conductive layer 250.

As observed from the top view, the seal 160 may be a ring shape or other suitable shapes. Materials of the support structure 162 of the seal 160 may include glass fiber, silica, the like, or a combination thereof, but the present disclosure is not limited thereto. Materials of the glue layer 164 of the seal 160 may include epoxy resins, hardeners, the like, or a combination thereof, but the present disclosure is not limited thereto. Materials of the seal 170 may be different from those of the seal 160. In some embodiments, the materials of the seal 170 may be the same as those of the seal 160 to reduce the manufacturing time. For example, the seal 170 also includes a support structure and a glue layer. The seal 170 and the seal 160 may be formed by any suitable process mentioned above, and the details are not described again herein to avoid repetition.

It should be appreciated that although the present embodiment initially illustrates the seal 160 and the seal 170 on the substrate 110, and the liquid crystals 260 on the substrate 210, but the present disclosure is not limited thereto. For example, after the seal 160, the seal 170, and the liquid crystals 260 are formed on one of the substrates (for example, the substrate 110), such substrate may be paired together with another substrate (for example, the substrate 210). Or, after the liquid crystals 260 are formed on the substrate 210, and the seal 160 and the seal 170 are formed on both the substrate 110 and the substrate 210, the substrate 110 and the substrate 210 may be paired together.

In some embodiments, when the electric field is generated through applying voltages to the lower electrode and the upper electrode of the electronic device 10, the liquid crystals 260 may be twisted to the desired angle. For example, the electronic device 10 may include a liquid-crystal module with the privacy function. Without any bias, the liquid crystals 260 are not twisted, so the electronic device 10 may appear to be transparent at any viewpoints. As the bias is applied, the liquid crystals 260 are twisted, so the electronic device 10 is only transparent at the direct viewpoint (for example, the viewpoint at the normal direction (for example, z-axis) of the substrate), while the electronic device 10 is non-transparent at the side viewpoints to achieve the privacy function. If the conductive layer 150 cannot transmit the electrode signals properly, the liquid crystals of the electronic device 10 may lose the twist function, causing the electronic device failure.

Referring to FIG. 4, the carrier 100 and the carrier 200 are removed. According to some embodiments of the present disclosure, the carrier 100 and the carrier 200 may be removed using laser lift-off (LLO) process. The bonds between the substrate and the carrier may be severed by irradiating laser, thereby separating the substrate 110 from the carrier 100, and the substrate 210 from the carrier 200. However, the high temperature during the removal process of the carrier 100 and the carrier 200 can generate deformation (for example, generating crease) to the substrate. That is, the originally flat film may become wavy film (or the film structure flowing up and down along the normal direction (for example, z-axis) of the substrate).

It should be appreciated that laser lift-off process can make the materials of the substrate 110 and the substrate 210 to become fragile, thus the deformation may be easily generated. However, the portion of the films encircled by the seal 170 is protected from generating deformation. Therefore, referring to FIG. 4, the portion of the films close to the seal 170 (for example, the films corresponding to the main part 152-1) does not have a crease C. In some embodiments, since the portion of the substrate 110, the metal layer 120, and the bonding part 152-2 close to the flexible printed circuit 190 is not encircled by the seal 170, the laser lift-off process may generate the crease C (or even further generate a fracture F) due to the lack of protection. The quantity of the crease C and the fracture F may be one or more. When the quantity of the fracture F becomes too large, or the fracture F continues to expand to entirely sever the bonding part 152-2, this may lead to the electronic device 10 unable to transmit the electrode signals effectively. Therefore, the disposition of the metal layer 120 may function as a mechanism to prevent the electronic device failure. In this way, when the bonding part 152-2 is unable to transmit the electrode signal, the electrode signal transmission may still be completed through the underlying metal layer 120, which has higher ductility and cannot be severed easily.

Still referring to FIG. 4, a polarizer 300 and a polarizer 400 are formed on another surface of the substrate 110 opposite from the conductive layer 150 and on another surface of the substrate 210 opposite from the conductive layer 250, respectively. According to some embodiments of the present embodiments, the polarizer 300 and the polarizer 400 may filter a specific direction of the light, so only a desired direction of the light may be transmitted.

Referring to FIG. 5, the dicing process may be performed on the electronic device 10 to remove the seal 170, along with the portion of the films outside the ring shape of the seal 170. Because the electrode signal needs to be transmitted from the flexible printed circuit 190 to the main part 152-1 through the bonding part 152-2, the link of the main part 152-1, the bonding part 152-2, and the flexible printed circuit 190 cannot be severed. Moreover, as stated above, the bonding part 152-2 is not encircled by the seal 170, thus the configuration of the main part 152-1, the bonding part 152-2, and the flexible printed circuit 190 is preserved on the substrate 110. In comparison, the flexible printed circuit 190 is not disposed on the substrate 210, thus the additional portion of the substrate 210 can be diced away. As a result, after the dicing process, the substrate 110 and the substrate 210 are not aligned. For example, the edge of the substrate 110 extends beyond the edge of the substrate 210. The dicing process of the present disclosure may include laser dicing, blade dicing, or a combination thereof, but the present disclosure is not limited thereto. After the dicing process, the fabrication of the electronic device 10 is complete.

Figure 6:
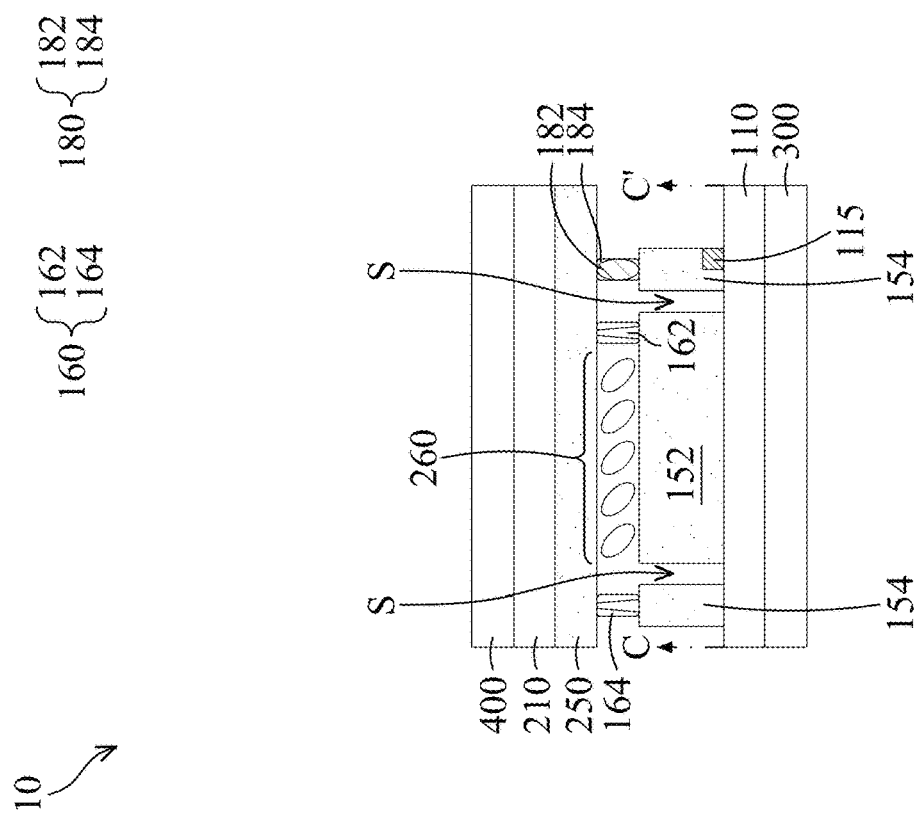
FIGS. 6 and 7 are cross-sectional views of the electronic device at other locations, according to some embodiments of the present disclosure.
Figure 7:
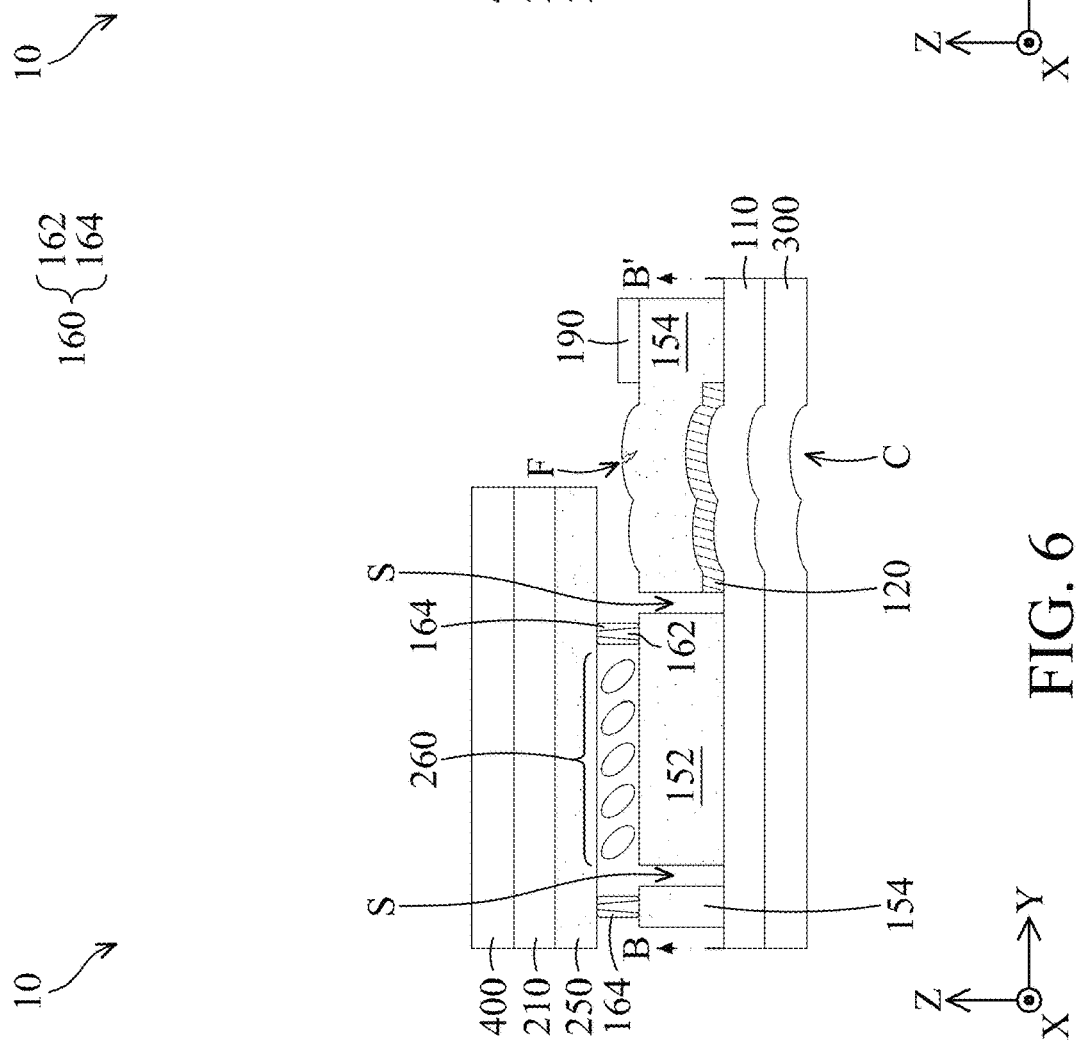

FIGS. 6 and 7 are cross-sectional views of the electronic device 10 at other locations, according to some embodiments of the present disclosure. It should be noted that FIG. 6 is the cross-sectional view obtained from a line B-B' of FIG. 1, while FIG. 7 is the cross-sectional view obtained from a line C-C' of FIG. 1. The features of the carrier 100, the substrate 110, the metal layer 120, the conductive layer 150, the seal 160, the seal 170, the flexible printed circuit 190, the carrier 200, the substrate 210, the conductive layer 250, and the liquid crystals 260 are similar to those illustrated in FIGS. 1 and 2, and the details are not described again herein to avoid repetition.

Referring to FIG. 6, the cross-sectional view of the completed electronic device 10 obtained from the line B-B' is illustrated. For simplicity, the procedures of FIGS. 2-4 are omitted. In comparison with FIG. 5, FIG. 6 illustrates the second conductive pattern 154 (for example, the bonding part 154-3). The metal layer 120 is formed between the substrate 110 and the second conductive pattern 154 (for example, the bonding part 154-3). Since the transmitted electrode signals are different, the first conductive pattern 152 and the second conductive pattern 154 are separated from each other by the spacing S. The bonding part 154-3 of the second conductive pattern 154 is extended from one end of the loop part 154-1 toward the flexible printed circuit 190.

Still referring to FIG. 6, since the bonding part 154-3, the portion of the substrate 110 corresponding to the bonding part 154-3, and the metal layer 120 are not encircled by the seal 170, the crease C is generated (or the fracture F may be further generated), and this may lead to the electronic device 10 unable to transmit the electrode signals effectively. In the present disclosure, the disposition of the metal layer 120 may function as a mechanism to prevent the electronic device failure. In this way, when the bonding part 154-3 is unable to transmit the electrode signal, the electrode signal transmission may still be completed through the underlying metal layer 120, which has higher ductility and cannot be severed easily. As such, the flexible printed circuit 190 may transmit the electrode signals to the first conductive pattern 152 and the second conductive pattern 154 through the metal layer 120 in order to control the correct twist of the liquid crystals 260. The failure risk of the electronic device 10 may be reduced, and the yield and the reliability of the electronic device 10 may be enhanced.

Referring to FIG. 7, the cross-sectional view of the completed electronic device 10 obtained from the line C-C' is illustrated. For simplicity, the procedures of FIGS. 2-4 are omitted. In comparison with FIG. 5, FIG. 7 illustrates a region without any bonding part. In the present embodiment, a portion of the seal 160 is disposed on the first conductive pattern 152 (for example, the main part 152-1), while another portion of the seal 160 is disposed on one segment of the second conductive pattern 154 (for example, the loop part 154-1). The metal line 180 may be formed on another segment of the second conductive pattern 154 (for example, the loop part 154-1).

Still referring to FIG. 7, a mark 115 is formed on the segment of the loop part 154-1 corresponding to the metal line 180, but the disposition of the mark 115 is not limited thereto. The mark may have a cross shape, or the like from the top view. According to some embodiments of the present disclosure, the mark 115 may provide alignment for the formation of the metal line 180. Materials and the formation of the mark 115 may be similar to those of the metal layer 120, and the details are not described again herein to avoid repetition.

Referring to FIG. 7, the metal line 180 may be located on the segment of the second conductive pattern 154 (for example, the loop part 154-1). In some embodiments, the metal line 180 is not extended onto the bonding part 154-2 and the bonding part 154-3 of the second conductive pattern 154. The metal line 180 may further transmit the electrode signal of the bonding part 154-2 and/or the bonding part 154-3 to the conductive layer 250. Although the metal line 180 is disposed on one side of the loop part 154-1, but the disposition and the length of the metal line 180 are not limited thereto. For example, the metal line 180 may be prolonged onto other sides of the loop part 154-1, or the metal line 180 may also be shortened. However, since the laser lift-off process may cause the substrate 110 to be curved, the metal line 180 needs to maintain a certain length to ensure the conduction of the electrode signal.

The metal line 180 may include a metal 182 and a glue layer 184. According to some embodiments of the present disclosure, the metal 182 may conduct the electrode signal, while the glue layer 184 may ensure the adhesion between the conductive layer 150 and the conductive layer 250. Materials of the metal 182 may include metal particles made of gold, silver, or the like, but the present disclosure is not limited thereto. Materials of the glue layer 184 may be similar to those of the glue layer 164, and the details are not described again herein to avoid repetition. The metal 182 and the glue layer 184 may be formed by any suitable process mentioned above.

Still referring to FIG. 7, the metal line 180 may be disposed between the conductive layer 150 and the conductive layer 250. Since the conductive layer 150 is encircled by the seal 170, the conductive layer 150 at the cross-sectional view obtained from the line C-C' does not have the crease C. Since the dicing process may remove the seal 170, along with the portion of the films outside the ring shape of the seal 170, the resulting substrate 110 and substrate 210 are aligned after the dicing process.

Figure 8B:
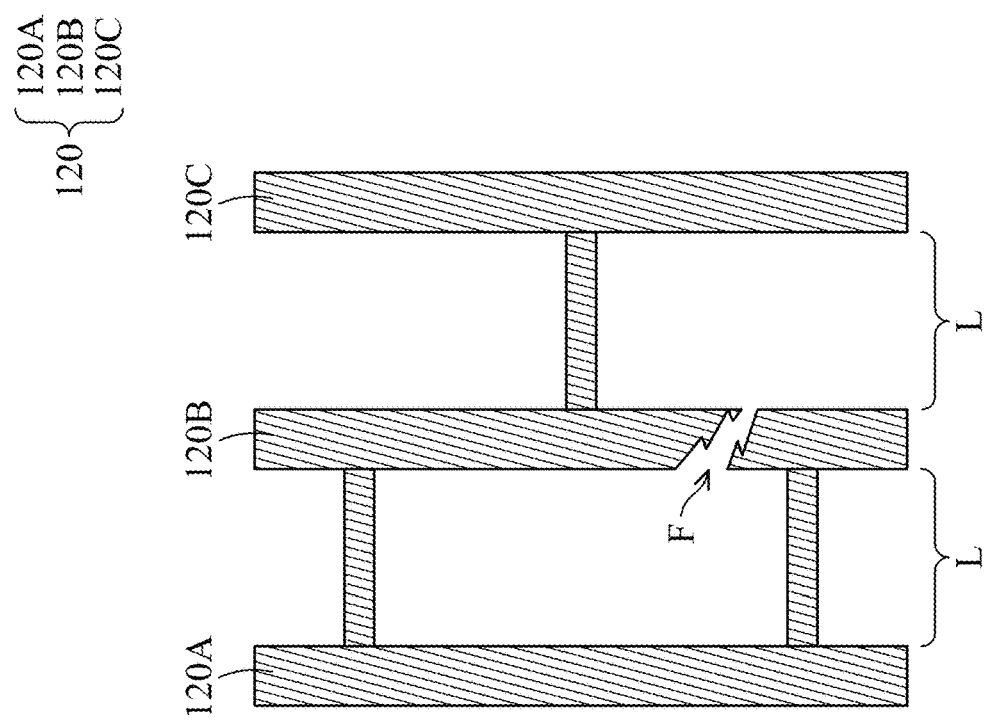
FIGS. 8A and 8B are top views of various designs of an element of the electronic device, according to some embodiments of the present disclosure.
Figure 8A:
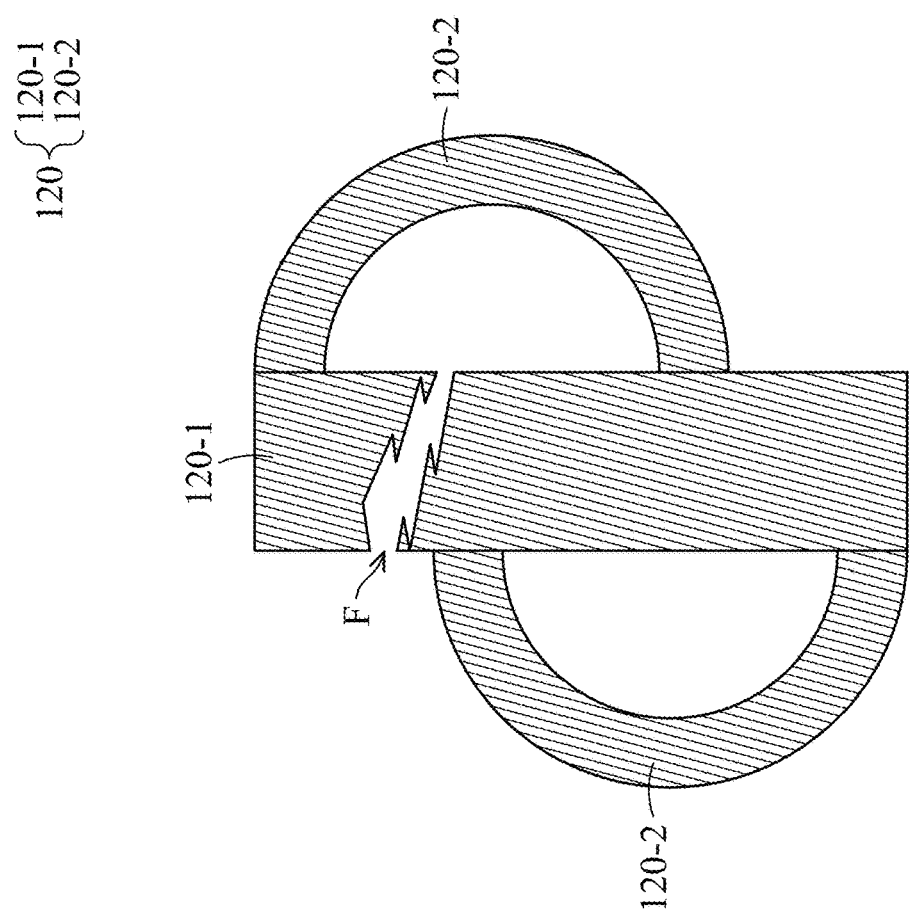

FIGS. 8A and 8B are top views of various designs of the metal layer 120 of the electronic device, according to some embodiments of the present disclosure. In comparison with FIG. 1, the metal layer 120 below the conductive layer 150 may have a grid structure. In some embodiments, the metal layer 120 respectively below the bonding part 152-2, the bonding part 154-2, and the bonding part 154-3 may have different designs of the grid structure. The feature of the metal layer 120 is similar to that illustrated in FIGS. 1 and 2, and the details are not described again herein to avoid repetition.

Referring to FIG. 8A, the metal layer 120 may include a main segment 120-1 and loop segments 120-2 on both sides of the main segment 120-1. Through the metal layer 120 of such design, multiple electrode signal transmission paths may be provided. The electronic device failure issue can be further prevented if the metal layer 120 is also severed that compromises the electrode signal transmission. For example, if the fracture F is generated at the main segment 120-1 that compromises the electrode signal transmission, the electrode signal transmission may still be completed through one or more loop segments 120-2. In some embodiments, the portion of the conductive layer 150 corresponding to the metal layer 120 may for example adopt the same pattern design. For example, the bonding part 152-2 may have a grid structure that corresponds to the grid structure of the metal layer 120. The grid structure of the bonding part 152-2 and the grid structure of the metal layer 120 (corresponding to the bonding part 152-2) are identical and overlapped.

Referring to FIG. 8B, the metal layer 120 may include a sub-segment 120A, a sub-segment 120B, a sub-segment 120C, and connect lines L. In some embodiments, the extending directions of the connect lines L are different from the extending directions of the sub-segment 120A, the sub-segment 120B, and the sub-segment 120C. In this way, the metal layer 120 may provide multiple electrode signal transmission paths. The electronic device failure issue can be further prevented if the metal layer 120 is also severed that compromises the electrode signal transmission, and the yield and the reliability of the electronic device may be enhanced. In some embodiments, the portion of the conductive layer 150 corresponding to the metal layer 120 may for example adopt the same pattern design.

FIGS. 9 and 10 are cross-sectional views of the electronic device 20, according to some embodiments of the present disclosure. In comparison with FIG. 2, the electronic device 20 further includes a passivation layer 130 and a metal layer 140. The features of the carrier 100, the substrate 110, the metal layer 120, the conductive layer 150, the seal 160, the seal 170, the flexible printed circuit 190, the carrier 200, the substrate 210, the conductive layer 250, and the liquid crystals 260 are similar to those illustrated in FIG. 2, and the details are not described again herein to avoid repetition.

Referring to FIG. 9, the passivation layer 130 is formed between the metal layer 120 and the first conductive pattern 152 (for example, the bonding part 152-2). According to some embodiments of the present disclosure, the passivation layer 130 may isolate the metal layer 120 from the overlying metal layer 140. Materials of the passivation layer 130 may be, for example, an organic layer, an inorganic layer, or a combination thereof.

Still referring to FIG. 9, an opening 130V is formed in the passivation layer 130. According to some embodiments of the present disclosure, the subsequently formed metal layer 140 may fill the opening 130V, so that the metal layer 120 and the metal layer 140 are electrically connected.

Referring to FIG. 9, the metal layer 140 is formed on the passivation layer 130. In some embodiments, the metal layer 140 may cover the passivation layer 130 and the opening 130V, and may further fill the opening 130V to connect to the metal layer 120. Materials and the formation of the metal layer 140 may be similar to those of the metal layer 120, and the details are not described again herein to avoid repetition. Through the disposition of two or more metal layers, the yield and the reliability of the electronic device may be enhanced.

Referring to FIG. 10, the cross-sectional view of the completed electronic device 20 is illustrated. For simplicity, the procedures of FIGS. 3 and 4 are omitted. Since the bonding part 152-2 and the portion of the films (for example, the substrate 110, the metal layer 120, the passivation layer 130, the metal layer 140) corresponding to the bonding part 152-2 are not encircled by the seal 170, the crease C is generated (or the fracture F may be further generated), and this may lead to the electronic device 20 unable to transmit the electrode signals effectively. Therefore, in the present disclosure, the disposition of the metal layer 120 and the metal layer 140 may function as a mechanism to prevent the electronic device failure. In this way, when the bonding part 152-2 is unable to transmit the electrode signal, the electrode signal transmission may still be completed through the underlying metal layer 120 and metal layer 140, which have higher ductility and cannot be severed easily.

Figure 11:
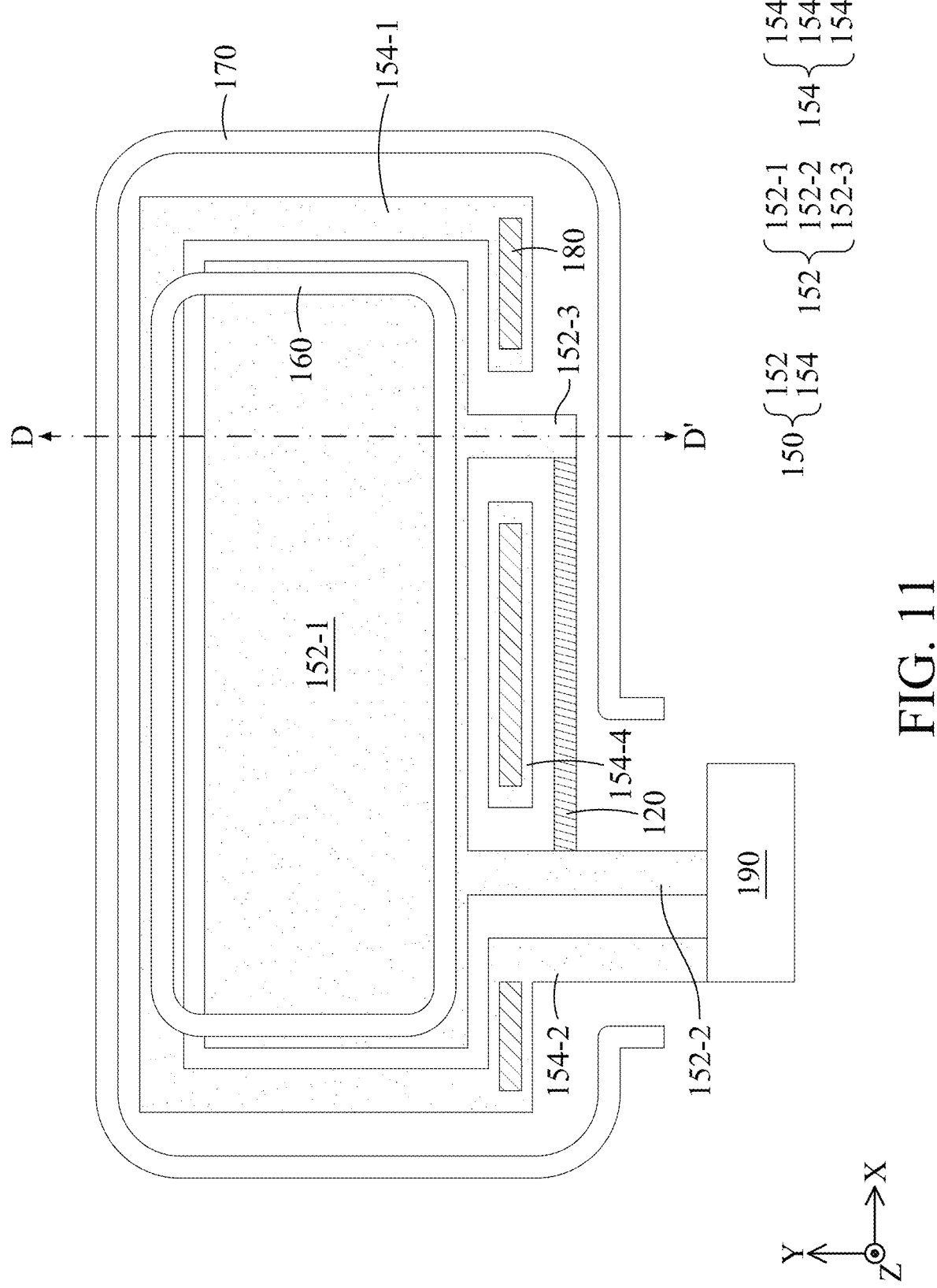
FIG. 11 is a top view of an electronic device, according to other embodiments of the present disclosure.

FIG. 11 is a top view of an electronic device, according to other embodiments of the present disclosure. In comparison with FIG. 1, the first conductive pattern 152 further includes a protruding part 152-3 extending outward from the main part 152-1. In addition, the metal layer 120 may be extended from below the bonding part 152-2 to below the protruding part 152-3. The segment of the metal layer 120 extending from below the bonding part 152-2 to below the protruding part 152-3 is not covered by the conductive layer 150. For example, the metal layer 120 is disposed below at least a partial segment of the bonding part 152-2 (including the segment close to the main part 152-1, the segment close to the flexible printed circuit 190, or a combination thereof), below at least a partial segment of the bonding part 152-3, and from the bonding part 152-2 to the protruding part 152-3 from the top view. In some embodiments, the first conductive pattern 152 further includes a segment (not shown) extending from the bonding part 152-2 to the protruding part 152-3, allowing the metal layer 120 to be covered by the first conductive pattern 152 without being exposed, so the oxidation of the metal layer 120 may be avoided. In some embodiments, the metal layer 120 may appear to be a U-shape, but the present disclosure is not limited thereto. Due to the disposition of the protruding part 152-3, the second conductive pattern 154 may further include an isolation part 154-4 that is isolated from the loop part 154-1. The metal line 180 is also conformally disposed on the isolation part 154-4 and on the segment of the loop part 154-1. The isolation part 154-4 is located between the bonding part 152-2 and the protruding part 152-3 from the top view. Or, the portion of the metal layer 120 below the protruding part 152-3 may be laterally disposed between the loop part 154-1 and the isolation part 154-4. In some embodiments, the second conductive pattern 154 may not have the isolation part 154-4, or the metal line 180 may not be disposed on the isolation part 154-4.

FIGS. 12 and 13 are cross-sectional views of the electronic device 30, according to other embodiments of the present disclosure. It should be noted that FIG. 12 is the cross-sectional view obtained from a line D-D' of FIG. 11. The features of the carrier 100, the substrate 110, the metal layer 120, the conductive layer 150, the seal 160, the seal 170, the flexible printed circuit 190, the carrier 200, the substrate 210, the conductive layer 250, and the liquid crystals 260 are similar to those illustrated in FIG. 2, and the details are not described again herein to avoid repetition.

Referring to FIG. 12, the metal layer 120 is formed between the substrate 110 and the first conductive pattern 152 (for example, the protruding part 152-3). In comparison with the bonding part 152-2, the protruding part 152-3 is extended from the main part 152-1 and still encircled by the seal 170. According to some embodiments of the present disclosure, the portion of the metal layer 120 located below the first conductive pattern 152 (for example, the protruding part 152-3) may provide an additional path for the electrode signal to be transmitted to the lower electrode. In some embodiments, as observed from the top view, the metal line 180 may include two portions at both sides of the protruding part 152-3, respectively.

Referring to FIG. 13, the cross-sectional view of the completed electronic device 30 obtained from the line D-D' is illustrated. For simplicity, the procedures of FIGS. 3 and 4 are omitted. Since the conductive layer 150 is encircled by the seal 170, the conductive layer 150 at the cross-sectional view obtained from the line D-D' does not have the crease C. The dicing process may remove the seal 170, along with the portion of the films outside the ring shape of the seal 170. As a result, the substrate 110 and the substrate 210 are aligned after the dicing process.

Figure 14:
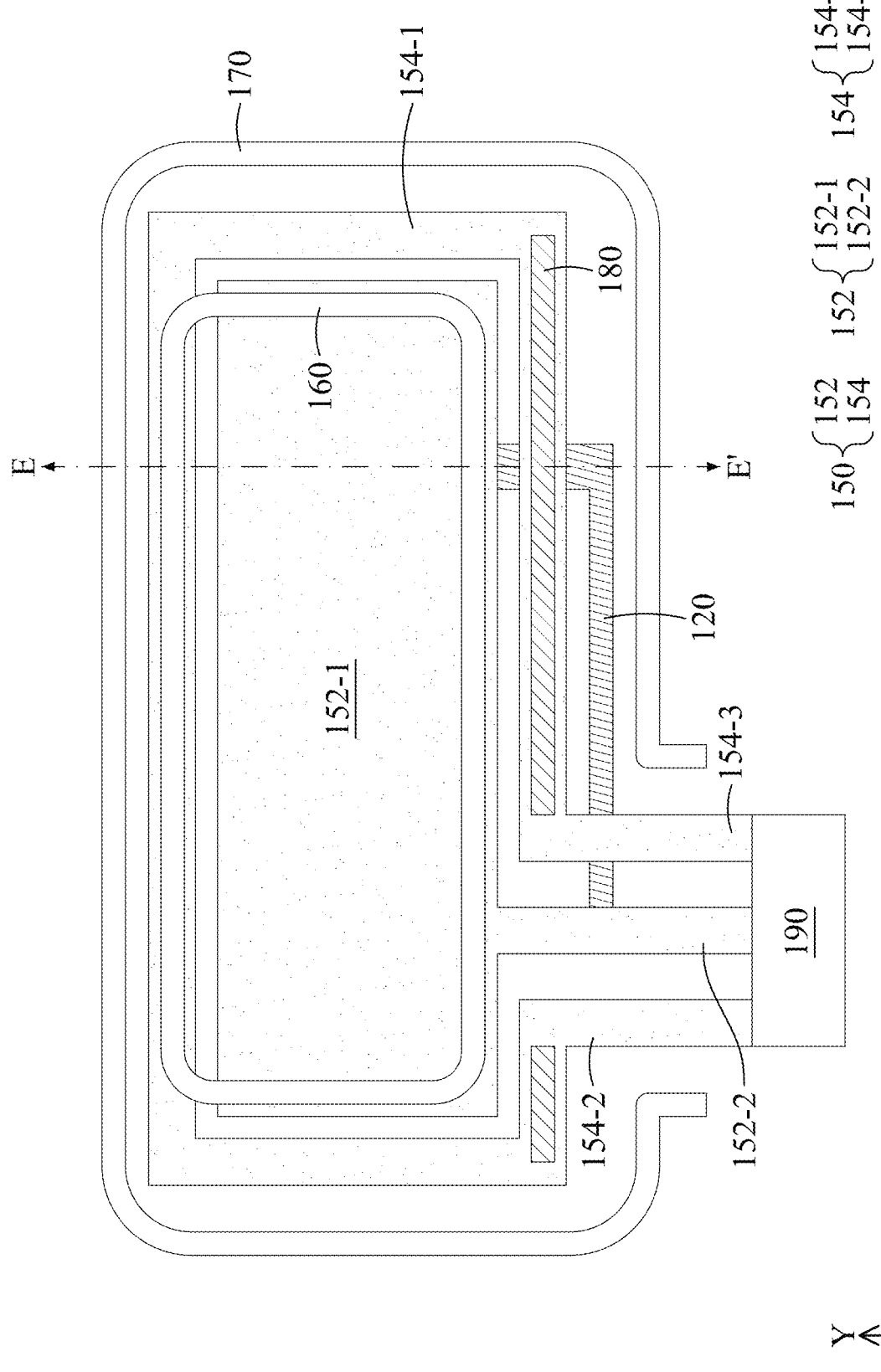
FIG. 14 is a top view of an electronic device, according to other embodiments of the present disclosure.

FIG. 14 is a top view of an electronic device, according to other embodiments of the present disclosure. In comparison with FIG. 11, in addition to the metal layer 120, the passivation layer 130 and the metal layer 140 are further included below the bonding part 152-2 of the conductive layer 150. However, the metal layer 120 and the passivation layer 130 may be extended together from below the bonding part 152-2 to the new electrode signal transmission path, and may be directly passing through below the loop part 154-1. The segments of the metal layer 120 and the passivation layer 130 extending outward from below the bonding part 152-2 are not covered by the conductive layer 150. In some embodiments, the metal layer 120 may be disposed between the substrate 110 and the bonding part 154-2. In some embodiments, the metal layer 120 is not disposed between the substrate 110 and the bonding part 154-3. In some embodiments, another metal layer (not shown) may be further included and is disposed on the passivation layer 130. The other metal layer may be disposed corresponding to at least one of the bonding part 152-2, the bonding part 154-2, and the bonding part 154-3, but the present disclosure is not limited thereto.

Figure 15:
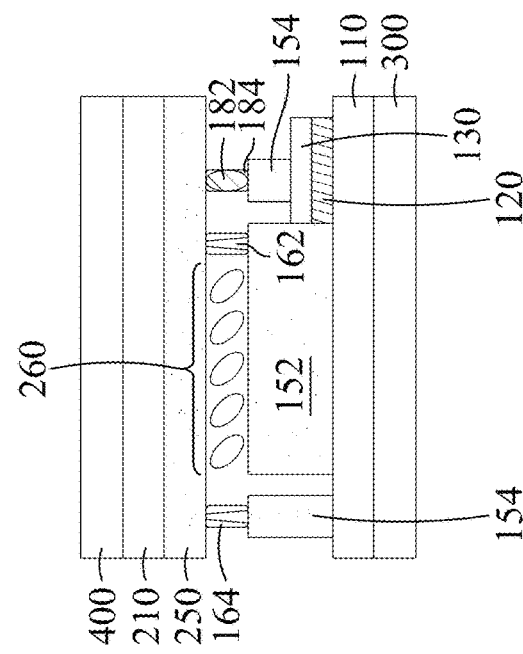
FIGS. 15 and 16 are cross-sectional views of the electronic device, according to other embodiments of the present disclosure.
Figure 16:
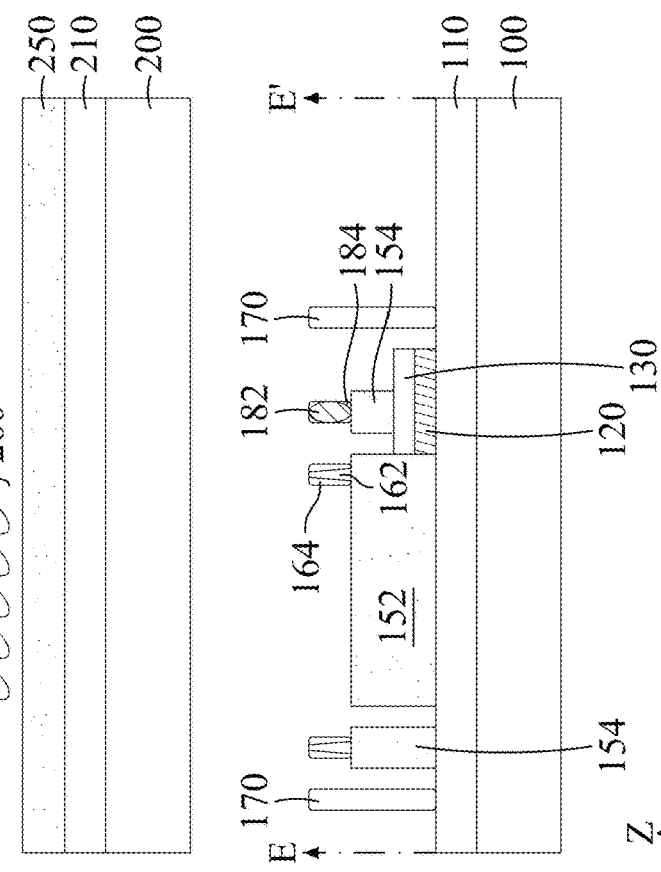

FIGS. 15 and 16 are cross-sectional views of the electronic device 40, according to other embodiments of the present disclosure. It should be noted that FIG. 15 is the cross-sectional view obtained from a line E-E' of FIG. 14. The features of the carrier 100, the substrate 110, the metal layer 120, the conductive layer 150, the seal 160, the seal 170, the metal line 180, the flexible printed circuit 190, the carrier 200, the substrate 210, the conductive layer 250, and the liquid crystals 260 are similar to those illustrated in FIG. 7, and the details are not described again herein to avoid repetition.

Referring to FIG. 15, the metal layer 120 is formed between the substrate 110 and the second conductive pattern 154 (for example, the loop part 154-1), and the passivation layer 130 is formed between the metal layer 120 and the second conductive pattern 154 (for example, the loop part 154-1). In comparison with the bonding part 152-2, the portions of the metal layer 120 and the passivation layer 130 extending passing the segment of the second conductive pattern 154 (for example, the loop part 154-1) are encircled by the seal 170. According to some embodiments of the present disclosure, the portion of the metal layer 120 extending passing the segment of the loop part 154-1 may provide an additional path for the electrode signal to be transmitted to the lower electrode. The failure risk of the electronic device 40 may be reduced, and the yield and the reliability of the electronic device 40 may be enhanced. In the present embodiment, the passivation layer 130 is added in order to insulate the metal layer 120 from the overlying metal line 180, and to protect the metal layer 120 from being oxidized. Therefore, the segment of the loop part 154-1 on the same side with the bonding part 152-2 and the overlying metal line 180 do not need to be disconnected.

Referring to FIG. 16, the cross-sectional view of the completed electronic device 40 is illustrated. For simplicity, the procedures of FIGS. 3 and 4 are omitted. Since the conductive layer 150 is encircled by the seal 170, the conductive layer 150 at the cross-sectional view obtained from the line E-E' does not have the crease C. The dicing process may remove the seal 170, along with the portion of the films outside the ring shape of the seal 170. As a result, the substrate 110 and the substrate 210 are aligned after the dicing process.

In the manufacturing process of the electronic device, the issues of the deformation (for example, the crease), the fracture, or even the severing may be easily generated in the substrate and the other films thereon, and this may lead to the electrode signals unable to be transmitted. The electronic device of the present disclosure includes the metal layer disposed between the flexible substrate and the conductive layer. Since the ductility of the metal layer is higher than that of the other films (for example, the conductive layer) on the substrate, the metal layer cannot be severed easily during the manufacturing process, which may assist the electrode signal transmission. The failure risk of the electronic device may be reduced, and the yield and the reliability of the electronic device may be enhanced.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. An electronic device, comprising:
a first substrate, wherein the first substrate is flexible;
a second substrate disposed corresponding to the first substrate, wherein the second substrate is flexible;
a first conductive layer disposed on the first substrate, comprising:
a first conductive pattern for receiving a first electrode signal and comprising a first bonding part; and
a second conductive pattern for receiving a second electrode signal and comprising a second bonding part;
a second conductive layer disposed on the second substrate and electrically connected to the second conductive pattern; and
a first metal layer disposed between the first substrate and at least one of the first bonding part and the second bonding part, and electrically connected to the at least one of the first bonding part and the second bonding part.

2. The electronic device of claim 1, wherein a portion of the first substrate corresponding to the at least one of the first bonding part and the second bonding part has a crease from a cross-sectional view.

3. The electronic device of claim 1, wherein the first bonding part has a fracture.

4. The electronic device of claim 1, wherein a portion of the first metal layer corresponding to the at least one of the first bonding part and the second bonding part has a grid structure from a top view.

5. The electronic device of claim 1, further comprising a seal disposed between the first conductive layer and the second conductive layer.

6. The electronic device of claim 1, wherein the first conductive pattern further comprising a protruding part, and the first metal layer extends from below the first bonding part to below the protruding part.

7. The electronic device of claim 1, further comprising:
a passivation layer disposed between the first metal layer and the first conductive layer, wherein the passivation layer has an opening; and
a second metal layer disposed between the passivation layer and the at least one of the first bonding part and the second bonding part, wherein the second metal layer fills the opening and is electrically connected to the first metal layer.

8. An electronic device, comprising:
a first substrate;
a second substrate disposed corresponding to the first substrate;
a first conductive layer disposed on the first substrate, comprising:
a first conductive pattern for receiving a first electrode signal and comprising a first bonding part; and
a second conductive pattern for receiving a second electrode signal and comprising a second bonding part;
a second conductive layer disposed on the second substrate and electrically connected to the second conductive pattern;
a first metal layer disposed between the first substrate and at least one of the first bonding part and the second bonding part;
a passivation layer disposed on the first metal layer, wherein the passivation layer has an opening; and
a second metal layer disposed on the passivation layer, wherein the second metal layer fills the opening and is electrically connected to the first metal layer.

9. The electronic device of claim 8, wherein the first conductive pattern further comprising a protruding part, and the first metal layer extends from below the first bonding part to below the protruding part of the first conductive pattern.

10. The electronic device of claim 8, wherein an edge of the first substrate extends beyond an edge of the second substrate.

11. The electronic device of claim 8, further comprising a flexible printed circuit (FPC) transmitting the first electrode signal and the second electrode signal to the first bonding part and the second bonding part, respectively.

12. The electronic device of claim 8, further comprising a metal line disposed between the first conductive layer and the second conductive layer, wherein the second electrode signal is transmitted to the second conductive layer through the metal line.

13. A method of manufacturing an electronic device, comprising:
providing a first carrier;
forming a first substrate on the first carrier, wherein the first substrate is flexible;
providing a second carrier;
forming a second substrate on the second carrier, wherein the second substrate is flexible;
assembling the first substrate with the second substrate through a first seal and a second seal;
removing the first carrier;
removing the second carrier; and
cutting off the second seal.

14. The method of claim 13, wherein removing the first carrier and the second carrier comprising using laser lift-off (LLO) process.

15. The method of claim 13, further comprising forming a first conductive layer on the first substrate.

16. The method of claim 15, further comprising patterning the first conductive layer.

17. The method of claim 15, further comprising forming a first metal layer between the first substrate and the first conductive layer.

18. The method of claim 17, wherein the first metal layer has a grid structure.

* * * * *